Sept. 4, 1962
D. P. CAMERON
3,052,365
BOAT TRANSPORT TRAILER
Filed Feb. 10, 1961
3 Sheets-Sheet 1
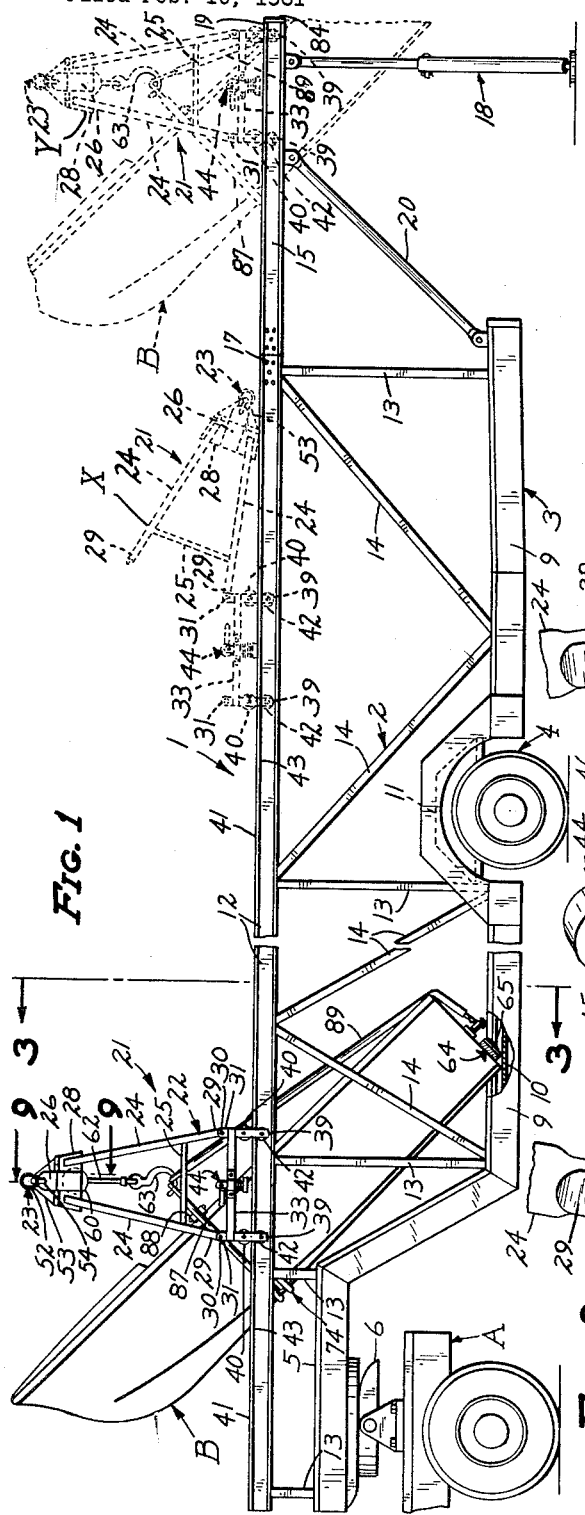
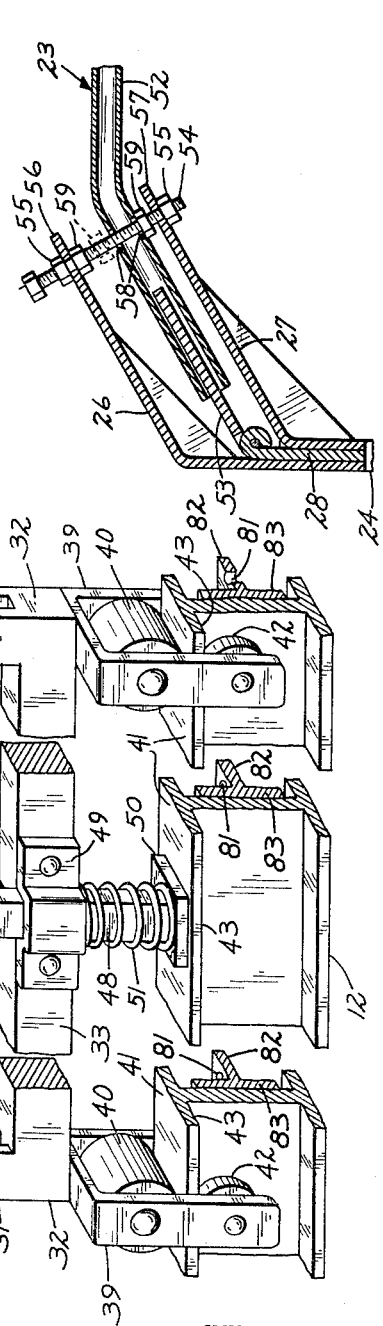
INVENTOR.
DARRELL P. CAMERON
BY
Merchant & Merchant
ATTORNEYS

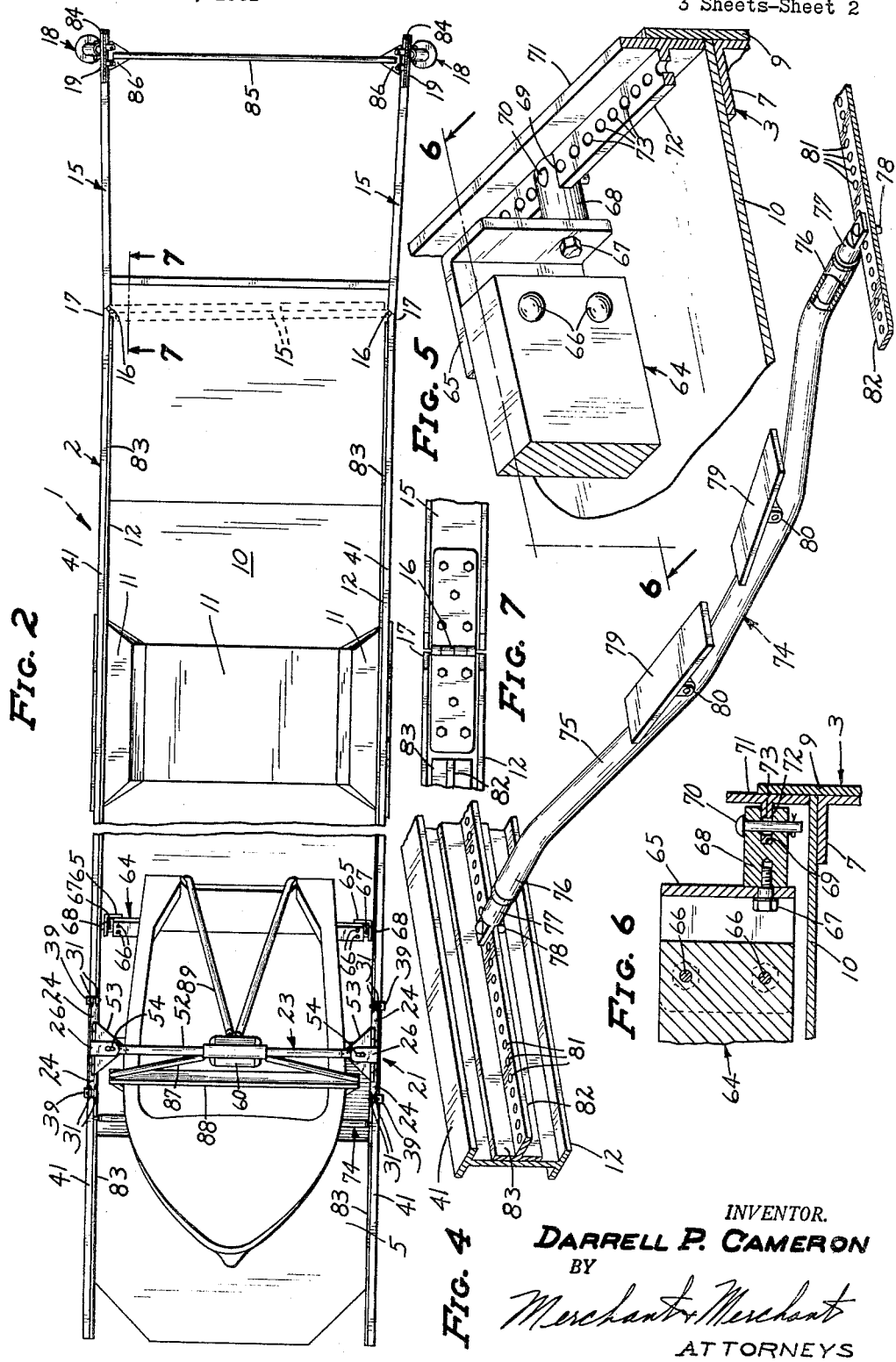

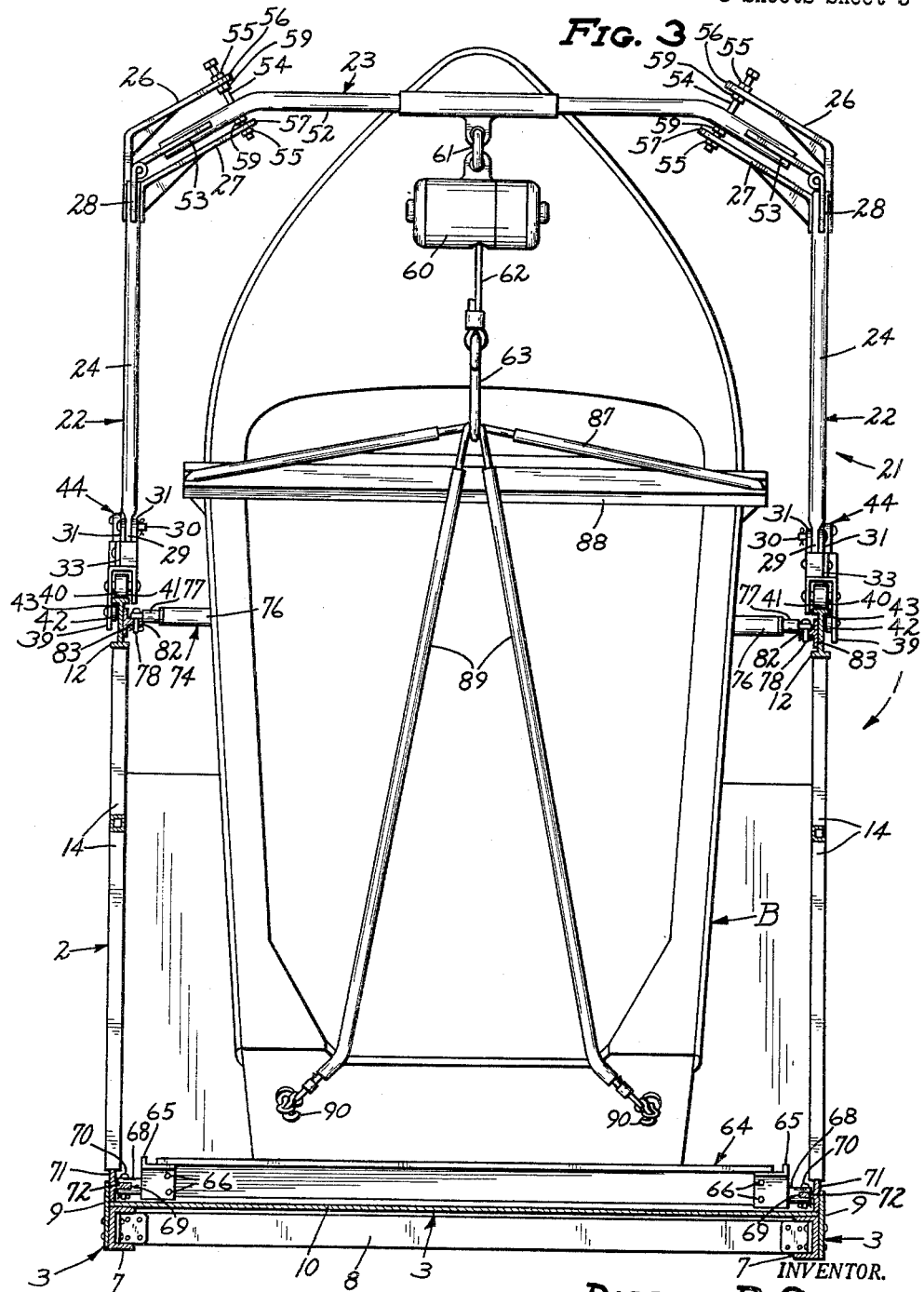

United States Patent Office 3,052,365
Patented Sept. 4, 1962

3,052,365
BOAT TRANSPORT TRAILER
Darrell P. Cameron, Little Falls, Minn., assignor to Bigelow-Sanford, Inc., a corporation of Delaware
Filed Feb. 10, 1961, Ser. No. 88,403
4 Claims. (Cl. 214—75)

This invention relates generally to trailing vehicles of the type adapted to be coupled to towing vehicles, and more particularly it relates to a boat transport trailer including means adapted to pick-up and hoist the boats to be carried by the trailer.

This invention has particular significance with respect to transport trailers of a type adapted to carry a plurality of boats disposed on the trailer in a generally regimented order. With respect to the above described type of boat transport trailers, several problems have been normally occasioned with respect thereto. One such problem is the normal difficulty experienced in satisfactorily and quickly loading and unloading the boats on the trailer and, another such problem is the difficulty experienced in providing satisfactory support means for the boats after they have been loaded onto the trailer, this being particularly true in devising adjustable support means which may be satisfactorily employed with boats of different shapes and sizes that are to be transported on the same trailer. Another such problem is the difficulty in loading and unloading, and even transporting, boats having a beam width dimension close to or equal to the legally permissible transverse dimension of the trailer. In light of the above introductory comments, a general object of this invention is the provision of a boat transport trailer which overcomes all the above mentioned problems, and therefore, as compared with the prior art, this invention is free from the objections normally presented by the above problems, and moreover also possesses further advantages which will be particularly set forth hereinafter. It might be well to note that although the foregoing problems are excellently illustrated in the use of my invention for the transportation of boats, said problems are not so limited in occurrence. Thus, the foregoing is not intended to restrict the solutions which the present invention affords to the application of the same to other types of trailer transportation situations, inasmuch as many other similar transportation problems may be similarly effected and cared for by the application of this invention.

An important object of this invention is the provision of a boat transport trailer which is equipped with a pair of generally parallel rails which include rearwardly projecting portions which extend beyond the frame structure of the trailer, and which is equipped with a novel hoist superstructure adapted to move on said rails including the rearwardly projecting portions thereof so as to provide my invention with means for loading and unloading boats to be carried by the trailer from a non-trailer supported position adjacent the rear of the trailer.

Another object of this invention is the provision of a boat transport trailer in which the above described rearwardly projecting rail portions thereof are constructed so that the same may be moved from said rearwardly projecting position thereof to a folded position adjacent the rear of the trailer when the rearwardly projecting portions of said rails are not in use.

Another object of this invention is the provision of a boat transport trailer in which the above described hoist superstructure thereof is constructed so that the same may be folded to a generally horizontal storage position when the same is not in use.

A further object of this invention is the provision of a boat transport trailer in which the above described rearwardly projecting rail portions of said trailer are flared in opposite laterally outwardly extending directions so as to permit the hoisting of boats by said hoist superstructure when said boats have a beam wider than the lateral dimension between the non-projecting portions of said rails. An ancillary object of this invention is the construction of said flared portions of said rails and the provision of said hoist superstructure whereby to permit boats to be carried by said trailer in such manner as to not be obstructed by the non-projecting portions of said rails when the lateral dimension between the same is less than the beam dimension of said boats.

A still further object of this invention is the provision of a boat transport trailer in which said hoist superstructure defines limited pivot means for permiting the same to travel with equal stability and effectiveness on said generally parallel non-projecting portions of said rails and also on the non-parallel and flared rearwardly projecting portions thereof.

Still another object of this invention is the provision of a boat transport trailer which is equipped with boat support struts which are designed and constructed so as to be adjustable with respect to the various positions in which the boats may be disposed on the trailer, and which are also adjustable with respect to the longitudinal axis of the trailer so as to permit adjustable longitudinal placement thereof adjacent each of the boats supported by the trailer when the boats to be carried by the trailer may be of varying shapes and sizes.

Other objects of this invention reside in the provision of a boat transport trailer which is extremely durable in construction, and highly efficient for providing satisfactory perfomance of its objects and purposes.

The foregoing and other objects and advantages of this invention will become apparent from the following detailed specification, appended claims and attached drawings.

Referring to the drawings wherein like reference characters indicate like parts or elements throughout the several views:

FIG. 1 is a view in side elevation of my invention, some parts being broken away, and alternative positions of portions of my invention being shown in dotted lines;

FIG. 2 is a view in top plan thereof, some parts being broken away, and also showing another position in dotted lines;

FIG. 3 is an enlarged view in vertical section taken substantially on the line 3—3 of FIG. 1;

FIG. 4 is an enlarged view in perspective of some parts of my invention, including the upper boat support struts, and some parts being broken away and some parts shown in section;

FIG. 5 is an enlarged view in perspective of some portions of my invention, including the connection of the lower boat support struts to the frame structure thereof;

FIG. 6 is a view in vertical section taken substantially on the line 6—6 of FIG. 5;

FIG. 7 is a view in vertical section taken on the line 7—7 of FIG. 2;

FIG. 8 is an enlarged view in perspective of some portions of my invention, including the lower part of one of the side frame sections of the hoist superstructure thereof, some parts being broken away and some parts shown in section; and FIG. 9 is a view in vertical section taken substantially on the line 9—9 of FIG. 1.

Referring with greater particularity to the drawings, the entire boat transport trailer, which comprises the present invention, is represented by the reference numeral 1. The boat transport trailer 1 is adapted to be coupled to a towing vehicle, which is represented in the drawings by the reference letter A. The boats which are shown in the drawings for the purpose of illustration are represented generally by the reference letter B. The boat transport trailer 1 comprises a frame structure, represented generally by the reference numeral 2, which frame structure 2 includes a floor section denoted generally by the reference numeral 3, and generally conventional chassis and wheel carriage means, denoted in its entirety by the reference numeral 4. The front end 5 of the trailer 1 defines conventional coupling means, as at 6, for connection to the towing vehicle A.

The floor section 3 of the frame structure 2 comprises a pair of cross-sectionally generally channel shaped longitudinal frame members 7 one each spaced on opposite sides of the trailer 1. The floor section 3 further comprises a plurality of transverse frame members represented by the reference numeral 8, and disposed intermediate the longitudinal frame members 7 and secured thereto at their opposite ends, one of the transverse frame members 8 being shown in FIG. 3. The floor section 3 of the frame structure 2 is also provided with generally parallel side plates 9, one each being secured on the outer side of each of the longitudinal frame members 7. Also, the floor section 3 of the frame structure 2 is covered with a conventional floor plate 10. It will be noted by reference to FIGS. 1 and 2 that the floor section 3 is elevated at the front end 5 thereof in the conventional manner, and the floor section 3 also defines a conventional axle hump 11 adjacent the chassis and wheel carriage means 4.

In accordance with my invention, the transport trailer 1 further comprises a pair of generally horizontal laterally spaced generally parallel generally I-shaped rails, each represented by the reference numeral 12. The rails 12 are rigidly secured, by means of a plurality of generally upstanding frame struts 13 and brace struts 14, to the floor section 3 of the frame structure 2 whereby to dispose said rails 12 in a generally longitudinally extending direction with respect to the direction of travel of the trailer 1.

As noted in the introduction of this application, it is highly desirable that means be provided adjacent the rear of a boat transport trailer for directly loading and unloading the boats onto and off of the trailer from or to a non-trailer supported position, such as an industrial truck, cart or dolly. Therefore, in accordance with this invention, the rails 12 define normally rearwardly projecting portions 15 which normally extend beyond the frame structure 2 of the trailer 1. The rearwardly projecting rail portions 15 are one each pivotally secured, as at 16, to a different one of the rearward ends 17 of the rails 12, whereby to equip said rearwardly projecting rail portions 15 for pivotal movements thereof between said normal rearwardly projecting positions thereof, shown in FIG. 1 and also shown by full lines in FIG. 2, and a folded position, shown by dotted lines in FIG. 2, adjacent the rear of the trailer 1. As shown particularly in FIGS. 1 and 2, a pair of telescoping support legs, each denoted generally by the reference numeral 18, are one each pivotally and dependingly secured near the rearward ends 19 of each of the projecting rail portions 15. Also, a pair of supporting knee struts 20 are one each pivotally secured at their opposite ends intermediate the associated projecting rail portions 15 and rails 12, as seen particularly in FIG. 2. Obviously, the provision of the support legs 18 and the supporting knee struts 20 is necessary for rigidly supporting the projecting rail portions 15 in the above-identified rearwardly projecting position thereof.

In order to permit the hoisting, in a manner which will be hereinafter particularly described, of the boats B when the boats B have a beam generally equal to or wider than the lateral dimension between the rails 12, the rearwardly projecting rail portions 15 are flared in opposite laterally outwardly extending directions, as seen particularly in FIG. 2. The boat pick-up and hoisting action of my invention is provided by means of a hoist superstructure, represented generally by the reference numeral 21. The hoist superstructure 21 is particularly adapted to move in both longitudinal directions on the rails 12, including the rearwardly projecting portions 15 thereof. The hoist superstructure 21 comprises a pair of transversely spaced generally upstanding side frame sections, each represented generally by the reference numeral 22, and one each thereof being associated with a different one of the rails 12. The hoist superstructure 21 further comprises a generally horizontally disposed central frame section 23 securely interposed between and connected to said side frame sections 22. Each of the side frame sections 22 is generally in the form of an A-frame construction, and each thereof comprises a pair of generally downwardly diverging legs 24 and a cross strut 25 secured and interposed between the legs 24 generally intermediate the opposite ends thereof. As seen particularly in FIGS. 1, 3 and 9, the upper ends of the legs 24 of each of the side frame sections 22 are rigidly secured to upper and lower generally upwardly and inwardly extending angle plates 26, 27 respectively. Also, a bearing forming hinge flange 28 is secured to the upper ends of the legs 24, the same being interposed intermediate the upper and lower angle plates 26, 27 as seen particularly in FIGS. 3 and 9.

Since it is an important part of this invention that the hoist superstructure 21 be adapted to run on the rails 12 in both longitudinal directions, each of the side frame sections 22 are mounted for rolling movements on the rails 12, in a manner which will be presently described. The lower ends 29 of the legs 24 of each of the side frame sections 22 are pivotally connected by means of pivot pins 30 to a pair of upstanding bearing lugs 31 defined on both of the opposite ends 32 of an elongated generally longitudinally disposed carriage bar 33, as shown particularly in FIG. 8. A pair of depending fork members 39 are one each rigidly secured on each of the opposite ends 32 of the carriage bar 33. Each of the fork members 39 is adapted to carry a rotatably secured upper roller 40 adapted to engage the upper surface 41 of the rail 12, and a rotatably secured lower roller 42 adapted to engage the lower surface 43 of the outer portion of the upper flange of the rail 12, as seen particularly in FIGS. 3 and 8. Obviously, the above-described construction provides extremely efficient means for permitting rolling movement of the hoist superstructure 21 in both longitudinal directions on the rails 12, including the rearwardly projecting rail portions 15 thereof. For the purpose of presenting lock means for locking the hoist superstructure 21 in any desired longitudinal position of the rails 12, a cam-acting lock, represented generally by the reference numeral 44, is secured generally intermediate the opposite ends 32 of the carriage bar 33 of each of the side frame sections 22 of the hoist superstructure 21, one of said cam-acting locks 44 being shown in the drawings. Each of the locks 44 comprises a cam element 45, which is equipped with a handle 46, the cam element 45 carrying a pivot pin 47 which is journalled within the upper end of a generally vertically disposed stop bar 48. The stop bar 48 is mounted and guided to the carriage bar 33 by means of a conventional mounting bracket 49, and the stop bar 48 also defines at the bottom end thereof a stop plate 50 adapted to securely engage and cooperate with the upper surface 41 of the rail 12 upon rotatable movement of the handle-equipped cam element 45. It is noted that the stop plate 50 of the stop bar 48 is biased in its engaged position with the upper surface 41 of the rail 12 by means of a coil spring 51.

As noted in an earlier portion of this specification, it is necessary that the hoist superstructure 21 be constructed so as to permit the same to travel with equal stability and effectiveness on the generally parallel non-projecting portions of the rails 12 and also on the non-parallel and flared rearwardly projecting rail portions 15. Therefore, the opposite ends of an elongated central frame rod 52 of the hoist superstructure 21 each carry a hinge pintle plate 53 adapted to cooperate with the bearing forming hinge flanges 28 described above so as to define limited pivot means at the connection of the central frame section 23 to the side frame sections 22. Referring particularly to FIGS. 3 and 9, it will also be noted that a stabilizing rod 54 is interposed between and rigidly secured by means of the lock nuts 55 intermediate the free ends 56, 57 of the upper and lower angle plates 26, 27. The central frame rod 52 defines adjacent both of its opposite ends an aperture 58 one each adapted to receive an intermediate portion of each of the stabilizing rods 54, and the stabilizing rods 54 are each provided with adjustable stop nuts 59 which are provided for the purpose of permitting adjustment of the limitations of the above-described pivotal hinging action of the hoist superstructure 21. As shown in FIG. 9, the apertures 58 of the frame rod 52 are considerably larger in diameter than the diameter of the stabilizing rods received therein so as to permit limited angular movements of the frame rod 52 between the upper and lower angle plates 26, 27 when the hoist superstructure 21 is moved onto the rearwardly projecting rail portions 15.

As seen particularly in FIG. 3, the hoist superstructure 21 is provided with a hoist machine 60, which is rigidly secured, as at 61, to the central frame rod 52. The hoist machine 60 includes a hoisting cable 62, which is equipped with a hook 63. Of course, the hoist machine 60 is adapted to pick-up and hoist the boats A carried by the trailer 1, which will be explained in detail in the portion of this specification dealing with the operation of my invention.

It is highly desirable that my invention be equipped with boat support struts which are designed and constructed so as to be adjustable with respect to the various positions in which the boat's beam may be disposed on the trailer 1, and which boat support struts are also adjustable with respect to the longitudinal axis of the trailer 1 so as to permit adjustable longitudinal placement thereof adjacent each of the boats B supported by the trailer 1 when the boats B carried by the trailer 1 may be of varying shapes and sizes.

Therefore, it is in accordance with my invention to provide a plurality of adjustable lower boat support struts, each represented generally by the reference numeral 64, which struts 64 are adapted to be adjustably secured to the frame structure 2 of the trailer 1 in generally transversely extending relationship thereto and in closely spaced relationship to the floor section 3 of the trailer 1. The lower boat support struts 64 are formed of a material such as wood, and are each provided at their opposite ends with angle brackets 65, which are rigidly secured thereto by means of the fasteners 66. The angle brackets 65 are each rotatably secured by means of a pivot pin 67 to a journal block 68, as seen particularly in FIG. 6, said journal blocks 68 each defining a generally horizontally opening slot 69 and each of said journal blocks 68 also being provided with a drop pin 70, which is slidably received within a pair of generally co-axial apertures, the axes of which extend generally normal to the slot 69. As seven particularly in FIGS. 2, 3 and 5, the frame structure 2 of the trailer 1 is provided with generally longitudinally extending T-bars 71, which are secured to the side plates 9 of the frame structure 2 on both sides of the trailer 1. The horizontal flanges 72 of each of the T-bars 71 define a plurality of closely spaced generally longitudinally extending generally co-linear apertures 73. The drop pins 70 carried by the opposite ends of each of the lower boat support struts 64 are adapted to be received within a transversely aligned pair of the apertures 73, so as to provide for the above described adjustable support of the boats B.

In accordance with my invention, a plurality of adjustable upper boat support struts, each represented generally by the reference numeral 74, are provided. The upper boat support struts 74 each comprise a somewhat arcuate elongated support tube 75, the opposite ends 76 of which define bearings for and one each rotatably receives one of a pair of journal pins 77, the outer ends of which define depending drop pins 78. The generally intermediate portion of each of the support tubes 75 is provided with a pair of adjustable support flanges 79, which are pivotally secured, as at 80, to the support tube 75. In a manner similar to the lower boat support struts 64, the drop pins 78 of the upper boat support struts 74 are adapted to be received within a transversely aligned pair of a plurality of apertures 81 defined in the horizontal flange 82 of a pair of laterally spaced generally longitudinally extending T-bars 83, one each of which is secured on the inner face of the web of the rails 12. It should be obvious from the above explanation, that the upper and lower boat support struts 74, 64 are so arranged and adapted to permit adjustable longitudinal placement thereof adjacent each of the boats B to be supported by the trailer 1.

It should be further noted that the rearward ends 19 of the rearwardly projecting rail portions 15 are provided with end plates 84, which of course prevent the hoist superstructure 21 from running off the rearwardly projecting rail portions 15. Also, the rearwardly projecting rail portions 15 are held in their open positions thereof shown by full lines in FIGS. 1 and 2, by means of a transverse brace 85, which is removably secured, as at 86, to the rearwardly projecting rail portions 15, as shown particularly in FIG. 2. It should be noted that an endless beam sling 87 is provided for lifting purposes, the same being adapted to be hooked on the hoist hook 63, and also being used with a stiffening strut 88. A stern belt 89 is also provided for use in combination with the beam sling 87, said stern belt 89 defining hooks 90 at its opposite ends. The above hoisting and rigging elements are shown particularly and in detail in FIG. 3.

Having specifically described my invention, a few comments with respect to the operation thereof should be added. Referring particularly to FIG. 1, it will be noted that two dotted line positions of the hoist superstructure 21 are shown. One dotted line position thereof, referred to herein as position x, shows the hoist superstructure 21 in a stored and folded position, wherein the forward pivot pins 30 have been removed from the connection between the lower ends 29 of the legs 24 and the bearing lugs 31 whereby to permit pivotal movement of the hoist superstructure 21 about the rearward pivot pins 30. The other dotted line position of the hoist superstructure 21 shown in FIG. 1, and referred to herein as position y, illustrates the initial loading of a boat B when the hoist superstructure 21 is positioned on the rearwardly projecting rail portions 15. Then the boat B is hoisted onto the trailer 1 and moved to the forward position shown in full lines in FIG. 1. Before each of the boats B is hoisted into the trailer 1, an upper boat support strut 74 and a lower boat support strut 64 are adjustably positioned with respect to the T-bars 71, 83 whereby to receive and securely support the boats B in the desired position. After the first boat B is loaded, the next pair of boat support struts 64, 74 is added, and the next boat B is placed onto said struts 64, 74, and so on until all of the boats B are loaded. Since my invention is particularly adapted for use with different sized boats and also with boats of different design and configuration, the lower and upper boat support struts 64, 74 are particularly adapted to be adjustable with respect to the longitudinal axis of the trailer 1 so as to permit adjustable longitudinal placement thereof for support of each of the boats B carried by the trailer 1 when the boats B to be carried by the trailer 1 may be of varying shapes and sizes. Since many State laws prevent the use on the highways of trailers having transverse dimensions beyond a certain limit, and since it may be desired to transport boats having beam width dimensions generally close or equal to said legal dimensions, the folding projecting rail portions 15 are formed so that the same flare outwardly and rearwardly whereby to permit hoisting of the wider portion of the boats B above the rails 12, after which they may be positioned so that the same are not obstructed or damaged by the non-projecting portions of the rails 12. After the boats B have been loaded onto the trailer 1, the rearwardly projecting rail portions 15 may be thereafter folded to the dotted line storage position thereof shown in FIG. 2. It should be obvious that the unloading of the boats B from the trailer 1 is accomplished in a manner substantially similar to that described above.

This invention has been thoroughly tested and found to be completely satisfactory for the accomplishment of the above objects; and while I have shown and described above a preferred embodiment thereof in which the principles of the present invention have been incorporated, I wish it to be specifically understood that the same may be modified without departure from the scope and spirit of the appended claims.

What I claim is:

1. A boat transport trailer adapted to be coupled to a towing vehicle, said trailer comprising a frame structure including a floor section and chassis and wheel carriage means, a pair of generally horizontal laterally spaced generally parallel rails rigidly secured to said frame structure in upwardly spaced relation to said floor section thereof and extending in a generally longitudinal direction with respect to the direction of travel of said trailer, said rails including normally rearwardly projecting portions which extend beyond the frame structure of said trailer, a hoist superstructure adapted to pick-up and hoist the boats carried by said trailer, means mounting and guiding said hoist superstructure for movements thereof on said rails including the rearwardly projecting portions thereof in both longitudinal directions whereby said boats may be engaged by said hoist and moved between a non-trailer supported position adjacent the rear of said trailer and a trailer supported position, said rearwardly projecting portions of said rails being flared in opposite laterally outwardly extending generally rearwardly diverging directions, and limited pivot means defined by said hoist superstructure for permitting the same to travel with equal stability and effectiveness on said generally parallel non-projecting portions of said rails and the non-parallel and flared rearwardly projecting portions thereof.

2. The structure defined in claim 1 in further combination with pivot means associated with said rearwardly projecting portions of said rails whereby said rearwardly projecting portions are equipped for pivotal movements between said normal rearwardly projecting position thereof and a folded position adjacent the rear of said trailer.

3. The structure defined in claim 1 in further combination with a plurality of boat support struts adapted to be adjustably secured to said trailer in generally transversely extending relationship thereto so as to permit adjustable longitudinal placement thereof for support of each of the boats carried by said trailer.

4. A boat transport trailer adapted to be coupled to a towing vehicle; said trailer comprising a frame structure including a floor section and chassis and wheel carriage means; a pair of generally horizontal laterally spaced generally parallel rails rigidly secured to said frame structure in upwardly spaced relation to said floor section thereof and extending in a generally longitudinal direction with respect to the direction of travel of said trailer; said rails including normally rearwardly projecting portions which extend beyond the frame structure of said trailers; pivot means associated with said rearwardly projecting portions of said rails whereby said rearwardly projecting portions are equipped for pivotal movements between said normal rearwardly projecting position thereof and a folded position adjacent the rear of said trailer; support means for rigidly supporting said projecting portions of said rails in said rearwardly projecting position thereof; said rearwardly projecting portions of said rails being flared in opposite laterally outwardly extending generally rearwardly diverging directions; a hoist superstructure including spaced generally upstanding side frame sections one each associated with each of said rails, a generally horizontally disposed central frame section securely interposed between and connected to said side frame sections, limited pivot means defined at the connections of said central frame section to each of said side frame sections for permitting the same to travel with equal stability and effectiveness on said generally parallel non-projecting portions of said rails and the non-parallel and flared rearwardly projecting portions thereof, and a hoist machine adapted to pick-up and hoist the boats carried by said trailer; said trailer further comprising means mounting and guiding the side frame sections of said hoist superstructure for movements of said hoist superstructure on said rails including the rearwardly projecting portions thereof in both longitudinal directions whereby said boats may be engaged by said hoist and moved between a non-trailer supported position adjacent the rear of said trailer and a trailer supported position; a plurality of adjustable lower boat support struts adapted to be adjustably secured to said frame structure of said trailer in generally transversely extending relationship thereto and in closely spaced relationship to the floor section of said trailer; and a plurality of adjustable upper boat support struts adapted to be adjustably and removably secured at their opposite ends adjacent a different one of said rails in generally transversely extending relationship thereto; said upper and lower boat support struts being so arranged as to permit adjustable longitudinal placement thereof for support of each of the boats carried by said trailer.

References Cited in the file of this patent
UNITED STATES PATENTS

| | | |
|---|---|---|
| 1,824,369 | Reid et al. | Sept. 22, 1931 |
| 2,778,512 | Strona | Jan. 22, 1957 |
| 2,779,486 | Klein | Jan. 29, 1957 |